United States Patent [19]
Dunmead et al.

[11] Patent Number: 5,942,204
[45] Date of Patent: Aug. 24, 1999

[54] METHOD TO PRODUCE A TRANSITION METAL CARBIDE FROM A PARTIALLY REDUCED TRANSITION METAL COMPOUND

[75] Inventors: Stephen D. Dunmead; Hobart A. Barker; John P. Henley; Pat J. DeLuca; Tom J. Bunnelle; Joe F. Repman; Daniel F. Carroll, all of Midland; Stephen A. Anderson, Sandford, all of Mich.

[73] Assignee: OMG Americas, Inc., Cleveland, Ohio

[21] Appl. No.: 08/967,965

[22] Filed: Nov. 12, 1997

Related U.S. Application Data

[60] Provisional application No. 60/042,896, Mar. 31, 1997.
[51] Int. Cl.⁶ .................................................. C01B 31/34
[52] U.S. Cl. ............................ 423/440; 423/439; 501/93
[58] Field of Search ................................... 423/439, 440; 75/505; 501/93; 264/65

[56] References Cited

U.S. PATENT DOCUMENTS

| | | | |
|---|---|---|---|
| 3,848,062 | 11/1974 | Steiger et al. | 423/440 |
| 3,850,614 | 11/1974 | Bleecker et al. | 75/5 |
| 3,932,594 | 1/1976 | Gortsema et al. | 423/440 |
| 4,008,090 | 2/1977 | Miyake et al. | 106/43 |
| 4,664,899 | 5/1987 | Kimmel et al. | 423/440 |
| 4,948,573 | 8/1990 | Nadkarni et al. | 423/291 |
| 5,166,103 | 11/1992 | Krstic | 501/87 |
| 5,372,797 | 12/1994 | Dunmead et al. | 423/430 |
| 5,380,688 | 1/1995 | Dunmead et al. | 501/87 |
| 5,389,585 | 2/1995 | Konig et al. | 501/87 |
| 5,567,662 | 10/1996 | Dunmead et al. | 501/87 |

OTHER PUBLICATIONS

Derwent Publications, 88–274855/39, J6 3201–009–A (Feb. 17, 1987).
Derwent Publications, 93–224074/28, JP 05147917–A (Dec. 2, 1991).
Derwent Publications, 91–373938/51, JO 3252–306–A (Dec. 1, 1990).
Derwent Publications, 92–068676/09, JO 4012–013–A (Apr. 26, 1990).
Derwent Publications, 88–176115/26, DE 3642–219–A (Dec. 10, 1986).

*Primary Examiner*—Michael Lewis
*Assistant Examiner*—Stuart L. Hendrickson
*Attorney, Agent, or Firm*—Kalow Springut & Bressler

[57] ABSTRACT

A transition metal carbide (e.g., WC) is prepared by the following steps. A carbon-precursor mixture is formed by mixing a precursor comprised of (i) a transition metal oxide (e.g., $WO_x$) and (ii) a material selected from the group consisting of: a transition metal (e.g., W); a transition metal carbide (e.g., WC) and a substoichiometric carbide ($W_2C$), in the presence of a source of carbon (e.g., carbon black) in an amount sufficient to form a reduced mixture comprised of the transition metal carbide and substoichiometric transition metal carbide, wherein the amount of the transition metal oxide and transition metal is essentially zero in said reduced mixture. The carbon-precursor mixture is heated in a reducing atmosphere (e.g., 5 percent hydrogen in argon) to a reducing temperature and for a time sufficient to produce the reduced mixture. The reduced mixture is milled in the presence of a source of carbon in an amount sufficient to carburize the substoichiometric transition metal carbide to form the transition metal upon heating in a reducing atmosphere. Finally, the milled reduced mixture is heated in a reducing atmosphere to a carburizing temperature that is greater than the reducing temperature for a time sufficient to carburize the substoichiometric transition metal carbide to form the transition metal carbide of this invention (e.g., WC).

15 Claims, No Drawings

METHOD TO PRODUCE A TRANSITION METAL CARBIDE FROM A PARTIALLY REDUCED TRANSITION METAL COMPOUND

CROSS-REFERENCE TO RELATED APPLICATION

This application claims the benefit of U.S. Provisional Application No. 60/042,896, filed Mar. 31, 1997.

FIELD OF THE INVENTION

The invention is directed to the production of carbides of the transition metals Ti, Zr, Hf, V, Nb, Ta, Cr, Mo and W and solution carbides of said transition metals.

BACKGROUND OF THE INVENTION

There are generally two forms of tungsten carbide; monotungsten carbide (WC) and ditungsten carbide ($W_2C$). It is well-known that WC is useful in the manufacture of commercially worthwhile items, such as cutting tools, dies and drilling tools, whereas $W_2C$ generally is not. In fact, $W_2C$ degrades the properties, such as strength of WC objects, even when present only in small quantities.

In producing said WC items, it is common for a tungsten carbide powder to be combined with a metal, such as cobalt and, subsequently, densified into a WC/Co cemented carbide by heating. The heating may take place at a pressure ranging from vacuum to pressures greater than atmospheric pressure.

In a cemented carbide part, the tungsten carbide, grain size, grain size distribution and grain chemistry greatly influence the final part properties. As already stated above, $W_2C$ should be avoided when making cemented tungsten carbide parts. Generally, smaller grain size in a cemented part results in improved strength. In addition, smaller grain sizes often result in higher hardness at a given cobalt addition. Non-uniformity of grain size in a cemented tungsten carbide part adversely affects the strength of and the surface condition of the part after grinding. The non-uniformity of grain size in the cemented WC part is primarily due to exaggerated grain growth during the densification of the part. The grain growth can be controlled by addition of grain growth inhibitors, such as VC, $Cr_3C_2$ or TaC, or starting with a WC powder having as narrow (i.e., uniform) as possible particle size distribution.

WC powder, which has an average particle size less than 0.2 to 0.3 micrometer, can cause exaggerated grain growth due to the increased reactivity associated with the fine particle size. It has also been reported that standard grain growth inhibitors, as described above, are not effective when sintering a cemented WC part using said fine WC powder. The critical parameter to sinter said fine WC powders was reported to be the WC powder grain size distribution (Suzuki et al, *J. Jap. Soc. Powder and Powder Met.*, Vol. 19, p. 106–112, 1972). Thus, it is desirable to be able to increase the particle size or control the particle size distribution of very fine WC powder (less than 0.2 to 0.3 micrometer) to reduce the possibility of grain growth during the densification of a cemented WC part.

Typically, monotungsten carbide is formed by the carburization of tungsten metal. The basic process steps commonly are:

(a) calcining of ammonium paratungstate or tungstic acid to one of the stable forms of tungsten oxide, such as $WO_3$, $WO_{2.83}$, $WO_{2.65}$ and $WO_2$, (b) reducing the tungsten oxide to tungsten metal powder in hydrogen, (c) mixing the tungsten metal powder with a powdered form of carbon and (d) carburizing the tungsten and carbon mixture at a temperature in excess of 1100° C. in a reducing (hydrogen containing) atmosphere.

The resultant WC particle size is controlled by the size of the W metal powder formed in the above step (b). Tungsten metal particle size, as described by U.S. Pat. No. 3,850,614, is controlled mainly by:

(1) depth of powder bed during reduction,
(2) flow rate of hydrogen,
(3) dew point of the hydrogen gas and
(4) reduction temperature.

Smaller particle size tungsten powder is produced by increasing gas flow, decreasing bed depth, reducing the dew point of the hydrogen gas and decreasing reduction temperature. By reducing the bed depth and reducing the temperature, the amount of tungsten powder that can be carburized to WC in a given period of time is decreased. The mechanism of growth has been attributed to a volatile WOH species directly associated with the water concentration in the gaseous environment (U.S. Pat. No. 3,850,614). Processes requiring the carburization of tungsten metal to form monotungsten carbide are, typically, limited to producing WC powder having a particle size of about 0.8 micron or larger because of the difficulty in producing W metal much smaller than this size due to, for example, the pyrophoric nature of such a fine tungsten metal powder. Because of the high hardness of WC, it is also difficult to grind WC to this small particle size. Even if WC were easily ground to the fine particle size, the grinding process inherently produces a wide particle size distribution compared to a controlled synthesis process.

Other methods of producing monotungsten carbide include the following methods. Steiger (U.S. Pat. No. 3,848,062) describes reacting a volatile tungsten species, such as $WCl_5$, $WCl_4$, $WCl_2$, $WO_2Cl_2$, $WOCl_4$, $WOF_4$ and $W(CO)_6$, with a vaporous carbon source, such as a volatile hydrocarbon or halogenated hydrocarbon. The vaporous carbon source is present in a quantity at least equal to WC stoichiometry during the above vapor phase reaction. The product from this reaction, a mixture of WC, $W_2C$ and carbon, is then calcined at a temperature of about 1000° C. for about 1 to 2 hours in hydrogen resulting in monotungsten carbide substantially free of ditungsten carbide.

Miyake (U.S. Pat. No. 4,008,090) describes a process having a first step of reacting a tungsten oxide with a carbon powder in a non-reducing atmosphere at a temperature greater than 1000° C., thereby removing the oxygen, and a second step of reacting the product of the first step at a temperature higher than the first step in hydrogen to produce monotungsten carbide. Miyake specifies that the temperature must be greater than 1000° C. in the first step to remove the oxygen. The removal of oxygen is necessary to avoid the reaction of hydrogen with oxygen forming water vapor which, consequently, reacts with carbon forming a volatile carbon-oxygen species, which causes the increase in particle size and non-uniform carbon content of the second step product (i.e., desired monotungsten carbide).

Kimmel (U.S. Pat. No. 4,664,899) describes a method to form monotungsten carbide comprising mixing tungsten oxide or ammonium paratungstate with carbon powder to form a resulting mixture, reducing said mixture in a non-reducing atmosphere, as Miyake does, for a sufficient time at a suitable temperature to produce resulting reduced mixture comprising tungsten, ditungsten carbide and monotungsten carbide, said reducing being carried out in the presence of sufficient carbon to produce a carbon content of less than 6.13 percent by weight in said resulting reduced mixture. Kimmel then describes determining the carbon content of said resulting reduced mixture, adding sufficient carbon to said resulting reduced mixture to increase the carbon content to at least the stoichiometric amount needed to form monotungsten carbide and carburizing in a hydrogen atmosphere the adjusted reduced mixture to form monotungsten carbide. Kimmel further describes that the product of the reducing of the tungsten oxide is a mixture of W, $W_2C$, WC and free carbon and that all of the oxide is reduced.

To make monotungsten carbide, these processes require either the slow process of complete reduction of a tungsten compound, such as tungsten oxide to tungsten metal in a hydrogen containing atmosphere, or the slow process of reduction of a tungsten compound to a mixture of tungsten metal, carbides of tungsten and free carbon in a non-reducing atmosphere (i.e., free of hydrogen). The tungsten or mixture is substantially free of oxygen (i.e., tungsten oxide) before finally carburizing in a reducing atmosphere to form monotungsten carbide. The oxygen is essentially completely removed to avoid particle growth due to formation of species, such as WOH, and the volatile loss of carbon by oxidation or hydrolysis during the carburization of the tungsten or mixture in a hydrogen-containing atmosphere. The removal of carbon during the carburization causes non-uniform carbon contents of the resultant carbide product (i.e., $W_2C$ in the product). Manufacture of fine WC powders with uniform carbon contents are particularly a problem in industrial processes because of the large volumes of material processed which exacerbates the aforementioned problems.

Therefore, it would be desirable to provide a rapid industrial method to produce monotungsten carbide (WC) of uniform carbon content and small particle size that avoids the aforementioned problems.

SUMMARY OF THE INVENTION

The object of this invention is a method to produce a transition metal carbide comprising:
a) forming a carbon-precursor mixture by mixing a precursor, comprised of (i) a transition metal oxide and (ii) one or more materials selected from the group consisting of: a transition metal carbide; a transition metal and a substoichiometric transition metal carbide, in the presence of a source of carbon in an amount sufficient to form a reduced mixture in step (b), the reduced mixture comprised of the transition metal carbide and substoichiometric transition metal carbide, wherein the amount of the transition metal oxide and transition metal is essentially zero,
b) heating the carbon-precursor mixture under a reducing atmosphere to a reducing temperature for a time sufficient to produce the reduced mixture,
c) forming a milled reduced mixture by milling the reduced mixture in the presence of a source of carbon sufficient to carburize the substoichiometric transition metal carbide in step (d) to form the transition metal carbide and
d) heating the milled reduced mixture in a reducing atmosphere to a carburizing temperature that is greater than the reducing temperature for a time sufficient to carburize the substoichiometric transition metal carbide to form the transition metal carbide.

The method of this invention, in particular, allows monotungsten carbide powder of uniform small size and chemistry to be formed at high rates even when the precursor has a significant amount of transition metal oxide present. The method also avoids the pyrophoric nature of fine tungsten metals when producing fine WC powders. The transition metal carbide powder(s) and, in particular, WC formed according to the method of this invention are useful as items, such as abrasives, and as a constituent in forming cemented carbide wear resistant parts, such as cutting tools, blast nozzles and dies.

DETAILED DESCRIPTION OF THE INVENTION

The Transition Metal Carbide

The method of this invention is directed at forming a transition metal carbide. The transition metal carbide is a carbide of a transition metal selected from the group consisting of: Ti, Zr, Hf, V, Nb, Ta, Cr, Mo, and W where the transition metal carbide has a stoichiometry corresponding to the following transition metal carbides: monotungsten carbide (WC), monotitanium carbide (TiC), monotantalum carbide (TaC), monovanadium carbide (VC), monohafnium carbide (HfC), monozirconium carbide (ZrC), mononiobium carbide (NbC), dimolybdenum carbide ($Mo_2C$) or trichromium dicarbide ($Cr_3C_2$). The transition metal carbide may be one or more of the above specific carbides or may be a solid solution carbide of the above carbides, for example, the solid solution carbide may be a solid solution carbide containing W and Ti provided that the carbon stoichiometry corresponds to the stoichiometry of the above transition metal carbides (e.g., ($W_{0.5}$, $Ti_{0.5}$)C). Preferably the transition metal carbide is a carbide selected from the group consisting of WC, TiC, TaC, VC, HfC, ZrC, NbC, $Mo_2C$, $Cr_3C_2$ and mixture thereof. When the transition metal carbide is a solid solution carbide, the solid solution carbide is preferably a solid solution carbide of at least two different transition metals selected from the group consisting of W, Ti, Ta, V and Cr. Most preferably the transition metal carbide is WC.

The transition metal carbide contains at most about 5 percent by weight of a substoichiometric transition metal carbide, essentially no free transition metal and essentially no oxide of the transition metal. The amounts of the transition metal, transition metal oxide and transition metal carbides are determined by X-ray diffraction. Substoichiometric transition metal carbide is a transition metal carbide that has a lower transition metal oxidation state compared to the transition metal carbides of this invention described above (e.g., $W_2C$ is a substoichiometric carbide). Essentially no free transition metal or essentially no transition metal oxide corresponds to an amount less than an amount detectable by powder X-ray diffraction. The amount of substoichiometric transition metal carbide present in the transition metal carbide is preferably less than about one percent by weight and more preferably the transition metal carbide contains essentially no substoichiometric transition metal carbide (i.e., none detected by X-ray diffraction). A suitable X-ray diffraction technique is described under the heading "Test Methods" herein.

The transition metal carbide may contain free carbon in an amount which does not deleteriously affect properties of an article produced from the metal carbide, such as a cemented tungsten carbide body. Preferably the amount of free carbon is less than about 0.2 percent, more preferably less than about 0.1 percent and most preferably less than about 0.05 percent by weight of the transition metal carbide. The free carbon may be determined by an acid digestion process described under "Test Methods" herein.

The particle size of the transition metal carbide, typically, has an average size by number of at most about 1.5 micrometers in diameter. Preferably the average size is at most about 1 micrometer, more preferably at most about 0.8 micrometer and most preferably at most about 0.6 micrometer to at least about 0.05 micrometer, more preferably at least about 0.1 and most preferably at most about 0.2 micrometer in diameter. The number average size may be determined by known metallographic techniques.

Method to Form Said Transition Metal Carbide

The first step in the method is to form a carbon-precursor (C-P) mixture by mixing a precursor comprised of (i) a transition metal oxide and (ii) one or more materials selected from the group consisting of: a transition metal carbide; a transition metal and a substoichiometric transition metal carbide, in the presence of a source of carbon in an amount sufficient to form a reduced mixture comprised of the transition metal carbide and substoichiometric transition metal carbide, wherein the amount of the transition metal oxide and transition metal is essentially zero in said reduced mixture.

In forming the C-P mixture, the method of mixing may be any suitable method, such as those known in the art. Mixing may be performed in a sigma mixer, muller mixer, V-blender and cone blender. If further particle size reduction of the precursor or carbon source is desired, the mixing may be carried out by milling using apparatus, such as a ball mill, jet mill, vibratory mill or an agitated mill, such as an attritor. If milling is performed requiring milling media (e.g., ball mill), the milling media is preferably cemented tungsten carbide-cobalt milling media. Ball milling is a preferred method of mixing. The mixing is carried out for a time sufficient to uniformly mix the source of carbon with the precursor. Generally, mixing time is at least about 15 minutes to at most about 24 hours.

Source of Carbon

The source of carbon is either carbon or a compound of carbon that decomposes under the reaction conditions of this invention to form carbon. The source of carbon may be crystalline carbon, amorphous carbon, organic material or combination thereof. Suitable crystalline or amorphous carbon includes, for example, graphite or carbon black, such as acetylene carbon black. An example of a carbon black useful in this invention is SHAWANIGAN™, available from Chevron Inc. Examples of organic material include organic polymers, such as phenol-formaldehyde resins, epoxies, cross-linked polystyrenes and cellulosic polymers, carbohydrates, such as sugars and starches and hydrocarbons. The source of carbon may be added or may be present in the precursor. Preferably at least a portion of the source of carbon is added to the precursor in forming the C-P mixture. The added carbon is preferably a crystalline or amorphous carbon. More preferably the source of carbon is carbon black.

The amount of carbon from the carbon source present in the C-P mixture should be an amount sufficient to reduce the concentration of the transition metal oxide and transition metal to essentially zero in a reducing atmosphere (i.e., carburize them to form the transition metal carbide or substoichiometric transition metal carbide). The quantity of carbon which is added to the precursor is, typically, determined empirically depending: on the transition metal carbide to be produced (e.g., WC); the amount of transition metal oxide and transition metal in the precursor and the reactor and reaction conditions of the "reducing step" (b). Generally, the amount of carbon present from the carbon source is less than the amount that theoretically would carburize the precursor mixture entirely to the transition metal carbide. Generally, the amount of carbon present from the carbon source in the carbon-precursor mixture is about 1 to about 5 percent by weight of the C-P mixture weight, more typically, the amount is in the range of about 2 to about 3 percent by weight of the C-P mixture weight.

Precursor

The precursor is comprised of (i) a transition metal oxide and (ii) a transition metal, transition metal carbide, substoichiometric transition metal carbide or combination thereof. The transition metal, when present, is at least one transition metal selected from the group consisting of: Ti, Zr, Hf, V, Nb, Ta, Cr, Mo and W. The transition metal carbide and substoichiometric carbide have each been previously described. The transition metal oxide is an oxide of transition metal selected from the group consisting of Ti, Zr, Hf, V, Nb, Ta, Cr, Mo and W. The oxide may be a monotransition metal oxide (e.g., $TiO_2$) or an oxide compound containing at least two of said transition metals. Carbon may also be present in the precursor. The carbon that may be present is either a residual reactant or is formed during the formation of the precursor. This free carbon may be crystalline or amorphous. The free carbon can originate from such carbon sources, such as carbon black, graphite or organic material, previously described.

The amount of transition metal oxide in the precursor corresponds to an amount of oxygen of at least about 0.5 percent by weight of the precursor to generally at most about 5 percent by weight of the precursor. The oxygen concentration may be determined by LECO analysis described under the heading of "Test Methods" herein.

As an illustration, when the transition metal carbide to be produced is monotungsten carbide, the precursor, for example, may be comprised of tungsten oxide ($WO_x$) and:
(1) tungsten;
(2) tungsten, ditungsten carbide and monotungsten carbide or
(3) tungsten, ditungsten carbide, monotungsten carbide and carbon.

Generally, the precursor is formed by at least partial reduction of a transition metal oxide powder by either carburization or reduction by hydrogen. Examples of methods that are suitable to form the precursor include methods described by U.S. Pat. Nos.: 4,008,090; 4,644,899; 3,850,614 and 3,848,060, each incorporated herein by reference. Preferably the precursor mixture is prepared by the rapid carbothermal reduction methods such as the entrainment or drop method (col. 4, lines 53–68, and col. 5, lines 1–12) described by U.S. Pat. No. 5,380,688, incorporated herein by reference.

Reducing the Carbon-Precursor Mixture (C-P Mixture)

The second step of the method, according to this invention, is the heating of the C-P mixture in a reducing atmosphere at a reducing temperature for a time sufficient to produce the reduced mixture comprised of the substoichiometric transition metal carbide and transition metal carbide, wherein the amount of the transition metal oxide and transition metal is essentially zero.

The C-P mixture is heated to the reducing temperature for a time sufficient to form the reduced mixture that contains, typically, an amount of substoichiometric carbide of at least about 10 percent by weight of the reduced mixture. More typically, the reduced mixture contains at least about 15 percent, even more typically, at least about 25 percent and most typically, at least about 50 percent substoichiometric transition metal carbide by weight of the reduced mixture. The balance of the reduced mixture, generally, is composed of the transition metal carbide and may also contain a small amount of free carbon, such as less than about 5 percent by weight of the reduced mixture. The reduced mixture contains essentially zero free transition metal as determined by X-ray diffraction, previously described. The reduced mixture also contains essentially zero transition metal oxide, which corresponds to an oxygen concentration of at most about 0.1 percent by weight of the reduced mixture, as determined by LECO analysis, described herein.

The reducing temperature is a temperature sufficiently great enough to form the reduced mixture to a temperature that is less than the melting temperature of the transition metal carbide. Generally, the reducing temperature is a temperature from about 900° C. to about 1800° C. Preferably the reducing temperature is from about 1000° C. to about 1600° C. The time at the reducing temperature is desirably as short a period of time as possible to form the reduced mixture. Preferably the reaction time is at least about 5 minutes, more preferably at least about 15 minutes, and most preferably at least about 30 minutes to preferably at most about 10 hours, more preferably at most about 5 hours and most preferably at most about 2 hours.

The reducing atmosphere is an atmosphere that can at least partially reduce the transition metal oxide to a transition metal in the absence of carbon at the reducing temperature. Examples of gases useful to produce the reducing atmosphere include hydrogen and inert gases containing hydrogen. Inert gases, herein, are He, Ne, Ar, Kr, Xe, An and Rn. Preferably the gas is a 2 percent to 6 percent hydrogen in argon gas mixture because these mixtures provide a reducing environment, while the amount of hydrogen in the mixture is below the explosive limit. It is surprising that a reducing gas may be used in this step since Miyake and Kimmel both describe the necessity to avoid the formation of water vapor in the reduction of the transition metal oxide to form a uniform transition metal carbide of fine particle size. The use of a reducing gas in this step advantageously increases the rate of reaction increasing the capacity of a given reactor with no discernible change in product uniformity or quality.

During the reduction of the C-P mixture, the atmosphere is preferably created by a flowing gas. The gas is desirably flowing to allow the removal of unwanted gaseous species, such as water vapor. Preferably the gas flow is about 5 to about 500 standard liters/min per kg of the C-P mixture and more preferably from about 25 to about 250 standard liters/min per kg of the C-P mixture.

The C-P mixture may be heated in a batch or continuous furnace. Suitable furnaces to heat the mixture include, for example, a tube furnace, pusher furnace, belt furnace, rotary furnace, elevator furnace, fluid bed reactor and rotary crucible furnace. It is desirable for the furnace to be constructed of materials which do not contaminate the admixture during the reaction. Preferably the furnace or reactor is constructed of carbon materials in at least the hot sections of the furnace or reactor. The carbon material should be of a purity that does not significantly contaminate the admixture. Since commercial graphite commonly has significant silicon contamination, the graphite or carbon that is used preferably has a silicon and total metal contamination of less than about 25 parts per million (ppm) and more preferably less than about 10 ppm.

Milling of the Reduced Mixture

The third step, (c), of the invention is the milling of the reduced mixture in the presence of a source of carbon sufficient to carburize the substoichiometric transition metal carbide present in the reduced mixture to form the transition metal carbide of this invention. It has been found that the use of milling of the reduced mixture before carburizing results in a transition metal carbide having uniform small particle size and carbon concentration. The use of milling is believed to allow the use of the reducing atmosphere in step (b) to quickly reduce the oxide and carburize any metal in the precursor mixture, while still obtaining a fine uniform transition metal carbide product.

Milling of the reduced mixture to form a milled reduced mixture may be carried out by a known or convenient method. Examples of milling include ball milling, jet milling, vibratory milling, planetary milling and attritor milling. Preferably the milling process uses milling media, such as ball milling, vibratory milling and attritor milling. When milling with milling media, the media is preferably cemented tungsten carbide-cobalt milling media. The most preferred method of milling is ball milling.

The source of carbon is the same as previously described. Further carbon may be added to the reduced mixture and milled with it in the same manner previously described. The amount of carbon should be an amount sufficient to form the transition metal carbide. Generally, the amount of carbon that is added is determined empirically from the carbon content of the reduced precursor mixture after it has been homogenized by milling. Carbon, if necessary, is then added and further milling is done to mix the added carbon to the milled reduced mixture. Generally, the amount of carbon (i.e., free carbon) in the mixed reduced mixture is about 0.1 to about 5 percent, more typically, the amount of carbon is from about 0.25 to about 4 percent by weight of the milled reduced precursor mixture.

Carburizing of the Milled Reduced Mixture

The final step of the process is to carburize the milled reduced mixture by heating this mixture in a reducing atmosphere to a carburizing temperature that is greater than the reducing temperature and for a time sufficient to carburize the substoichiometric transition metal carbide present in the milled reduced mixture to form the transition metal carbide.

The carburizing temperature is a temperature sufficiently great enough to form the transition metal carbide to a temperature that is less than the melting temperature of the transition metal carbide. Generally, the carburizing temperature is at least about 100° C. higher and more preferably at least about 200° C. higher than the reducing temperature. Generally, the carburizing temperature is a temperature from about 1000° C. to about 2000° C. Preferably the carburizing temperature is from about 1200° C. to about 1800° C. More preferably the carburizing temperature is from about 1300° C. to about 1700° C. The time at the carburizing temperature is desirably as short a period of time as possible to form the reduced mixture. Preferably the reaction time is at least about 5 minutes, more preferably at least about 15 minutes, and most preferably at least about 30 minutes to preferably at most about 10 hours, more preferably at most about 5 hours and most preferably at most about 2 hours.

The atmosphere is a reducing atmosphere that has been previously described. During the carburizing step, the atmosphere is preferably created by a flowing gas. Preferably the gas flow is about 5 to about 500 standard liters/min per kg of the milled reduced mixture and more preferably from about 25 to about 250 standard liters/min per kg of the milled reduced mixture.

The carburizing step may be carried out in a batch or continuous furnace previously described.

TEST METHODS

The following are typical methods for analyzing the transition metal carbide, precursor, C-P mixture, reduced mixture and milled reduced mixture described herein.

Carbon

The carbon concentration is determined using a "LECO" IR-212 carbon analyzer™. A "LECO" supplied tungsten carbide standard having 6.16 percent by weight carbon is used to calibrate the analyzer. The analyzer is calibrated using at least 4 standard analyses as described by the manufacturer (LECO). Each sample and standard is analyzed with a scoop of LECOCEL II™ and iron chips. The scoop is provided by the manufacturer (LECO). At least four samples are analyzed.

Oxygen

The oxygen concentration is determined using a "LECO" TC-136 oxygen determinator. A 0.0246 percent by weight oxygen standard is used. The oxygen determinator is calibrated using at least 4 standard analyses as described by the manufacturer of the determinator. A sample is analyzed by placing about 0.2 gram of sample in a manufacturer supplied tin capsule and nickel basket. At least four samples are analyzed.

Surface area

Surface area is determined by nitrogen gas adsorption as described by the BET method (Brunauer, Emmett and Teller). The analysis is performed on a Quantachrome Autosorb 1 analyzer (Quantachrome, Syosset, N.Y.).

Free Carbon

The free carbon is determined by acid digesting an amount of sample, such as the transition metal carbide (e.g., WC) in hydrofluoric and nitric acid, filtering the carbon residue onto a silver filter and determining the carbon on the silver filter by the method described above for determining carbon concentration.

Phase Determination

The phases and quantity of differing phases is determined by X-ray diffraction. The quantity of phases is determined by a method involving the ratio of peak heights or integrated peak areas between peaks caused by differing phases. For example, the quantity of $W_2C$ is calculated from the ratio between 2 times the peak height of the $W_2C$ peak at a "d" spacing of 2.276 Angstroms divided by the heights of the WC peaks at a "d" spacing of 2.518 and 1.884 Angstroms.

The following examples are solely for illustrative purposes and are not to be construed as limiting the scope of the present invention.

EXAMPLES

Example 1

A particulate mixture was prepared by ball milling about 332 kilograms of $WO_3$ and about 68 kilograms of carbon (C) for about 0.2 hour in a 600 gallon (2270 liter) ball mill that contained about 8000 pounds (3630 kilograms) of 0.5 inch (12.7 mm) diameter WC-6 percent by weight Co milling media. The tungsten tri-oxide ($WO_3$) had an average particle size of about 5.2 microns, a surface area of 5.0 $m^2/g$ and is available from TACOW Trade Consultants, Ltd., Owego, N.Y., under the trade name Scopino Yellow Oxide. The carbon black (C) was Chevron Shawinigan Acetylene Black. The surface area of these powders was determined by nitrogen gas adsorption using a Quantacrome Autosorb 1 (Quantachrome, Syosset, N.Y.). After ball milling, the powder mixture was passed through a coarse (8 mesh, 2.36 mm) screen to remove the milling media.

About 130 kilograms of the particulate mixture were loaded into the feed hopper of a vertical graphite tube reaction furnace of the type disclosed in U.S. Pat. Nos. 5,110,565 and 5,380,688. The furnace tube was 3.35 meters (m) long and had a 15.2 centimeter (cm) inside diameter. The feed hopper was connected to the cooled reactant transport member of the furnace by a twin screw loss-in-weight feeder. The reactant transport member had an inside diameter of 1.3 cm and was maintained at a temperature of approximately 10° C. (283K) by water flowing through a cooling jacket surrounding the reactant transport member. The feed hopper was purged with argon gas for 30 minutes after the particulate mixture was loaded into it, while the furnace tube was brought to a temperature of about 1810° C. (2083K), as measured by optical pyrometers viewing the outside wall of the reaction chamber. Argon gas flowed into the reactant transport member at a rate of about 6 standard cubic feet per minute "scfm" (170 standard liters per minute "slm").

The particulate mixture was then fed from the feed hopper into the cooled reactant transport member at a rate of about 30 kilograms per hour by the twin screw feeder. The flowing argon gas entrained the particulate mixture and delivered it to the reaction chamber as a dust cloud. The particulate mixture was heated in the reaction chamber at a rate of approximately 10,000° C. to 100,000,000° C. per second. The average residence time of the particulate mixture in the furnace was between about 3 to about 4 seconds.

After exiting the hot zone of the reaction chamber, the flowing argon and carbon monoxide (generated during the carbothermal reduction reaction) gas mixture carried the product (referred to as raw precursor) into a water cooled stainless steel jacket that rapidly cooled the raw precursor below 10° C. (283K). After exiting the reactor, the raw precursor was collected in a plastic bag that was inserted in a stainless steel drum.

About 5 kilograms of the raw precursor were homogenized by ball milling in a 1.6 gallon ball mill for 2 hours with about 9.0 kg of 12.7 mm diameter WC-6 percent Co milling media to form the precursor. The precursor had an oxygen concentration of about 1.05 percent by weight and a total carbon concentration of about 6.15 percent by weight, as measured by LECO fusion and combustion apparatus (Leco Corporation, St. Joseph, Mich.). About 23 grams of C (Chevron Shawinigan Acetylene Black) were then added to the precursor and the mixture was ball milled for an additional 2 hours to form a carbon-precursor mixture (C-P mixture). The C-P mixture was then heat treated at about 1400° C. (1673K) for about 100 minutes in a graphite pusher furnace in graphite boats each containing about 14 kilograms of the C-P mixture to form a reduced mixture. This finishing treatment was done in a flowing (about 6.5 scfm "about 182 slm") atmosphere of 95 percent Ar and 5 percent $H_2$.

The reduced mixture was homogenized as described above. The reduced mixture, after homogenization, had a total carbon concentration of about 6.02 percent by weight, free carbon concentration of about 0.15 percent by weight, oxygen concentration of about 0.17 percent by weight and surface area of about 1.86 $m^2/g$. Then about 5 kilograms of the reduced mixture was milled, as described above, with about 8 grams of carbon (Chevron Shawinigan Acetylene Black) to form a milled reduced mixture.

The milled reduced mixture was heated to about 1600° C. (1873K) for about 100 minutes using a graphite pusher furnace and boats previously described. The monotungsten carbide product had a total carbon concentration of about 6.15 percent by weight, free carbon concentration of about 0.02 percent by weight, oxygen concentration of about 0.08 percent by weight and surface area of about 0.89 $m^2/g$.

Example 2

Example 2 was the same as Example 1 except that (1) the precursor had an oxygen concentration of about 1.5 percent by weight and carbon concentration of about 6.51 percent by weight, (2) about 5 kilograms of precursor was mixed with about 14 grams of carbon to form the C-P mixture and (3) about 5 kilograms of the reduced mixture was milled with about 9 grams of carbon to form the reduced milled mixture.

The reduced mixture, after homogenization, had a total carbon concentration of about 6.00 percent by weight, free carbon concentration of about 0.20 percent by weight, oxygen concentration of about 0.15 percent by weight and a surface area of about 1.95 m$^2$/g. The monotungsten carbide product had a total carbon concentration of about 6.14 percent by weight, free carbon concentration of about 0.03 percent by weight, oxygen concentration of about 0.08 percent by weight and surface area of about 1.01 m$^2$/g.

Comparative Example 1

The precursor was the same as used in Example 1. About 28 grams of C (Chevron Shawinigan Acetylene Black) were added to about 5 kilograms of the precursor and the mixture was ball milled for about 2 hours, as described by Example 1, to form a carbon-precursor mixture (C-P mixture). The C-P mixture was then heat treated at about 1600° C. (1873K) for about 120 minutes in a graphite pusher furnace and graphite boats, as described by Example 1, to form a final monotungsten carbide product. This finishing treatment was done in a flowing (about 6.5 scfm "182 slm") atmosphere of 95 percent Ar and 5 percent H$_2$.

The final monotungsten carbide product had a total carbon concentration of about 6.12 percent by weight, free carbon concentration of about 0.09 percent by weight, oxygen concentration of about 0.10 percent by weight and surface area of about 1.02 m$^2$/g.

Comparative Example 2

The precursor was the same as used in Example 2. About 21 grams of C (Chevron Shawinigan Acetylene Black) were added to about 5 kilograms of the precursor and the mixture was ball milled for about 2 hours, as described by Example 1, to form a carbon-precursor mixture (C-P mixture). The C-P mixture was then heat treated at about 1600° C. (1873K) for about 120 minutes in a graphite pusher furnace and graphite boats, as described by Example 1, to form a final monotungsten carbide product. This finishing treatment was done in a flowing (about 6.5 scfm "182 slm") atmosphere of 95 percent Ar and 5 percent H$_2$.

The final monotungsten carbide product had a total carbon concentration of about 6.10 percent by weight, free carbon concentration of about 0.16 percent by weight, oxygen concentration of about 0.09 percent by weight and surface area of about 1.00 m$^2$/g.

From Examples 1 and 2 and Comparative Examples 1 and 2, it is apparent that the two step process of (i.e. heating of the C-P mixture and milled reduced mixture) results in a final monotungsten carbide that has a lower free carbon concentration than a single heat-treatment of the precursor.

What is claimed is:

1. A method to produce a transition metal carbide comprising:
   a) forming a carbon-precursor mixture by mixing a precursor comprised of (i) a transition metal oxide and (ii) one or more materials selected from the group consisting of: a transition metal carbide; a transition metal and a substoichiometric transition metal carbide, in the presence of a source of carbon in an amount sufficient to form a reduced mixture in step (b), the reduced mixture comprised of the transition metal carbide and substoichiometric transition metal carbide, wherein the amount of the transition metal oxide and transition metal is essentially zero,
   b) heating the carbon-precursor mixture under a reducing atmosphere to a reducing temperature for a time sufficient to produce the reduced mixture,
   c) forming a milled reduced mixture by milling the reduced mixture in the presence of a source of carbon sufficient to carburize the substoichiometric transition metal carbide in step (d) to form the transition metal carbide and
   d) heating the milled reduced mixture in a reducing atmosphere to a carburizing temperature that is greater than the reducing temperature for a time sufficient to carburize the substoichiometric transition metal carbide to form the transition metal carbide.

2. The method of claim 1 wherein the precursor is formed by an entrainment method.

3. The method of claim 1 wherein the precursor is comprised of tungsten, monotungsten carbide, ditungsten carbide, free carbon and tungsten oxide of the formula WO$_x$.

4. The method of claim 1 wherein the transition metal carbide is selected from the group consisting of WC, TiC, TaC, VC, HfC, ZrC, NbC, Mo$_2$C, Cr$_3$C$_2$ and mixture thereof.

5. The method of claim 4 wherein the transition metal carbide is WC.

6. The method of claim 1 wherein the milling of step (c) is ball milling.

7. The method of claim 1 wherein the reducing temperature is from about 1000° C. to about 1600° C.

8. The method of claim 1 wherein the carburizing temperature is from about 1200° C. to about 1800° C.

9. The method of claim 1 wherein the reducing gas is 2 percent to 6 percent by volume of hydrogen in an inert gas.

10. The method of claim 9 wherein the inert gas is argon.

11. The method of claim 1 wherein the transition metal carbide contains free carbon in an amount of at most about 0.1 percent by weight of the transition metal carbide.

12. The method of claim 11 wherein the free carbon is at most about 0.05 percent by weight of the transition metal carbide.

13. The method of claim 1 wherein the reducing atmosphere is a flowing gas.

14. The method of claim 1 wherein the transition metal carbide has a particle size of at most about 1.0 micrometer in diameter.

15. The method of claim 1 wherein the transition metal carbide has a particle size of at most about 0.8 micrometer in diameter.

* * * * *